Sept. 6, 1955 G. W. PRICE 2,717,360

DOUBLE L MIXER

Filed June 29, 1951

INVENTOR.
GEORGE W. PRICE
BY Marvin Moody
ATTORNEY

United States Patent Office 2,717,360

Patented Sept. 6, 1955

2,717,360

DOUBLE L MIXER

George W. Price, Cedar Rapids, Iowa, assignor to Collins Radio Co., Cedar Rapids, Iowa, a corporation of Iowa

Application June 29, 1951, Serial No. 234,419

3 Claims. (Cl. 333—6)

Figure 1:
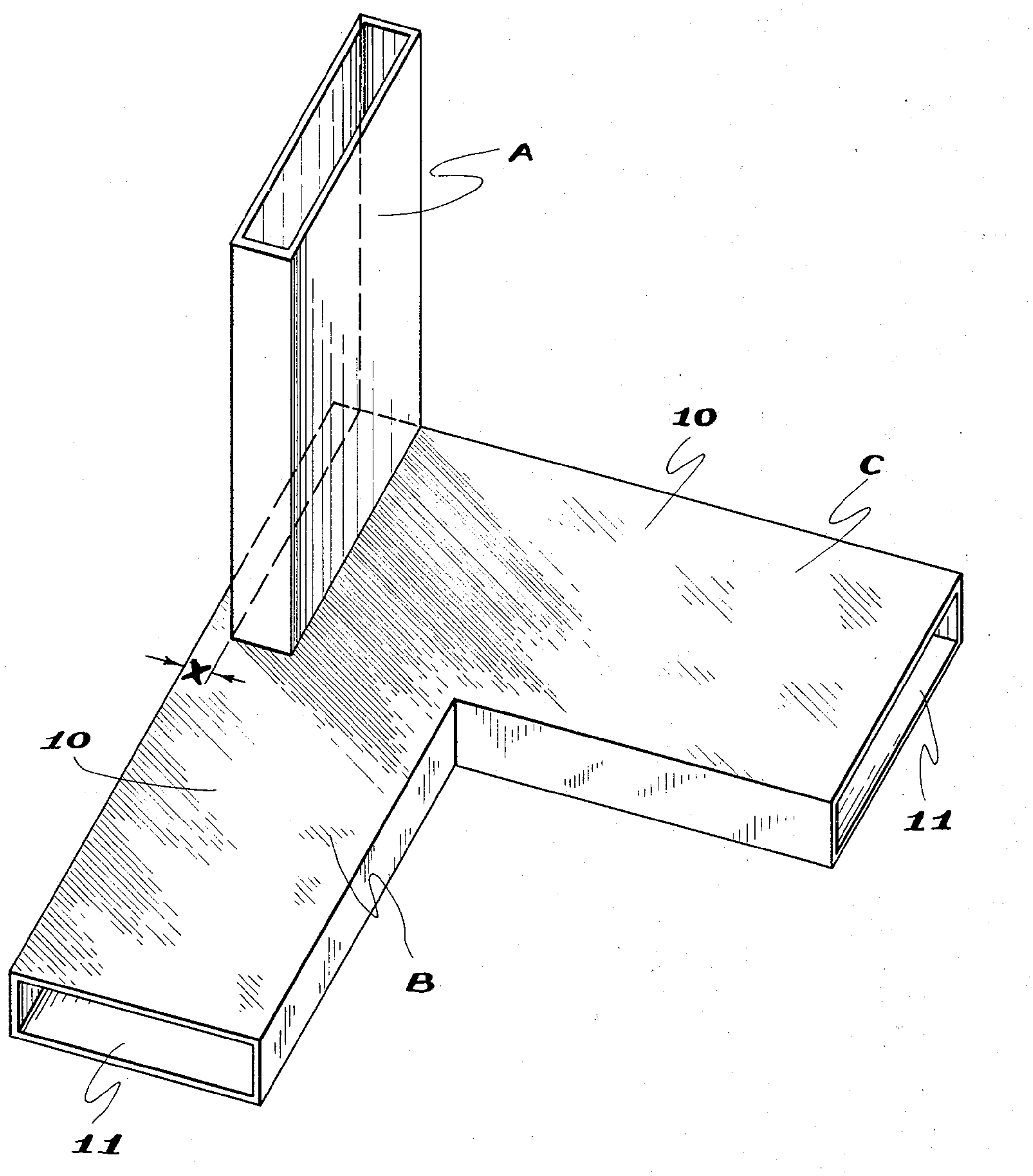

This invention relates in general to a wave guide mixer and in particular to a double L wave guide transition.

In radio communications, it is usually necessary to have an oscillator for the transmitter and the receiver. It is very advantageous if the local oscillator can be used for the transmitter and the receiver in that one oscillator may be eliminated from the equipment and the cost thus decreased.

It is an object of this invention therefore, to provide a novel double L wave guide section that may be used with a transmitter and a receiver.

Another object of this invention is to provide a double L mixer in which an incoming signal will be substantially all transmitted to a leg of the mixer connected to a receiver and a very small amount of the incoming signal will be supplied to the transmitter leg.

Yet another object of this invention is to provide a mixer which has three legs, one of which is connected to an antenna, another which is connected to a receiver, and a third which is connected to a transmitter. A single local oscillator furnishes power to the transmitter and the transmitter output is substantially all passed to the antenna. The energy received by the antenna is substantially all passed to the receiver.

Further objects, features and advantages of this invention will become apparent from the following description and claims when read in view of the drawing, in which:

Figure 1 is an isometric view of the double L mixer of this invention.

Figure 1 illustrates the wave guide mixer of this invention and comprises three legs, A, B and C, with legs B and C having their upper and lower side walls 10 and 11 in parallel planes. Wave guide section (or leg) A is mounted at right angle to leg C. Leg A is mounted a distance "$x$" from the edge of the leg B as shown.

If a transmitter is connected to leg A, substantially all of the power supplied by the transmitter will pass down wave guide A and out through wave guide leg C. If an antenna is mounted to leg C, the power from the transmitter connected to leg A will substantially all be supplied to the antenna.

Experiments conducted by applicant have shown that approximately one ninth of the power supplied to leg A will pass down leg B. Thus, if a receiver is connected to leg B, it will receive a small input from the transmitter.

Energy from the antenna flowing into leg C will substantially all pass into leg B with approximately one ninth of the energy passing into leg A. Thus, a received signal will nearly all pass to the receiver.

It is seen that the mixer of this invention allows a single oscillator to be used for both the transmitter and the receiver, thus eliminating the need for an oscillator in the receiver. The output of the oscillator is, of course, modulated when intelligence is to be transmitted. At times when no intelligence is being transmitted, the transmitter will continue to provide an output to the leg A but it will be unmodulated. An incoming signal received by the antenna and supplied to leg C will be mixed in the receiver with the signal received from the transmitter. Assuming that the received energy is at a frequency different from that of the transmitting frequency, an intermediate frequency will be obtained.

Another use of this mixer is as a power directing device which allows power supplied into one leg to pass into a second leg whereas power supplied into the second leg will pass to a third leg.

Applicant has discovered experimentally that the distance "$x$" must be adjusted to optimize the desired effect. An "$x$" of one tenth the width of the wave has operated very satisfactorily for applicant. It has also been discovered that "$x$" should be less than one half the width of the wave guide used. Applicant has built and tested apparatus according to this invention in the 10, 3 and 1.25 centimeter wavelength ranges. The sizes of wave guides are:

| Wavelength in centimeters | Waveguide size in inches |
|---|---|
| 10 | 1½ x 3 |
| 3 | ½ x 1 |
| 1.25 | ⅙ x 0.40 |

Although this invention has been described with respect to a particular embodiment, it is not to be so limited as changes and modifications may be made therein which are within the full intended scope of the invention as defined by the appended claims.

I claim:

1. A double L mixer for controlling energy flowing through various legs of the mixer comprising, a first wave guide leg, a second wave guide leg connected to the first wave guide leg to form an L with the top walls of the first and second wave guide legs lying in the same plane, a third wave guide leg mounted to the first and second wave guide legs and extending at right angles to the plane of the top walls of the first and second wave guide legs and with one of its narrow sides coincident with the side of the second wave guide leg, and its transverse side off-set a distance "$x$" from the side of the first wave guide leg where $x$ is less than one-half the width of the first wave guide section.

2. A wave guide mixer comprising, first, second, and third wave guide sections with the first and second wave guide sections joined so as to have their top walls in a common plane and to form an L, the third wave guide section mounted to the first and second wave guide sections at right angles to the common plane, and with the edge of the third wave guide section off-set a constant distance "$x$" from the edge of the first wave guide section where $x$ is less than one-half the width of the first wave guide section.

3. A double L mixer comprising, first, second, and third rectangular wave guide sections with the first and second wave guide sections joined to form an L and with their top walls mounted in a common plane, a third wave guide section mounted to the first and second wave guide sections and extending transversely from the common plane and with the narrower dimension of the third rectangular wave guide section coincident with the edge of the second wave guide section, and the long dimension of the third wave guide section off-set a distance "$x$" from the edge of the first wave guide section where $x$ is less than one-half the width of the first wave guide section.

References Cited in the file of this patent

UNITED STATES PATENTS

| | | |
|---|---|---|
| 2,445,895 | Tyrrell | July 27, 1948 |
| 2,498,548 | Howard | Feb. 21, 1950 |
| 2,564,030 | Purcell | Aug. 14, 1951 |
| 2,577,540 | Pound | Dec. 4, 1951 |
| 2,587,590 | Brewer | Mar. 4, 1952 |

OTHER REFERENCES

"Principles and Applications of Waveguide Transmission," by G. C. Southworth, Van Nostrand Co., Inc., N. Y., 1950. Page 204.